(12) United States Patent
Ghassabian

(10) Patent No.: US 6,681,014 B1
(45) Date of Patent: Jan. 20, 2004

(54) WRIST-MOUNTED TELEPHONE DEVICE

(75) Inventor: Yoram Ghassabian, Tel Aviv (IL)

(73) Assignee: Firooz Ghassabian, Great Neck, NY (US)

( * ) Notice: Subject to any disclaimer, the term of this patent is extended or adjusted under 35 U.S.C. 154(b) by 0 days.

(21) Appl. No.: 09/471,698

(22) Filed: Dec. 23, 1999

Related U.S. Application Data

(63) Continuation-in-part of application No. 08/867,062, filed on Jun. 2, 1997, now Pat. No. 6,035,035.
(60) Provisional application No. 60/114,739, filed on Jan. 4, 1999.

(51) Int. Cl.$^7$ ................................................ H04M 1/00
(52) U.S. Cl. ................................................... 379/433.1
(58) Field of Search ........................ 379/433.1, 433.01, 379/433.12, 433.13; 455/90, 575

(56) References Cited

U.S. PATENT DOCUMENTS 6,035,035 A  *  3/2000  Firooz ..................... 379/433.1

FOREIGN PATENT DOCUMENTS

| EP | 0602828 A1 | * | 6/1994 | ............... 379/433.1 |
| JP | 4-277958 | | * 10/1992 | ............... 379/433.1 |

* cited by examiner

*Primary Examiner*—Jack Chiang
(74) *Attorney, Agent, or Firm*—Sofer & Haroun, LLP

(57) ABSTRACT

A cellular telephone device comprising two C-shaped members which are configured to be detachably secured around a wrist of a user. The members have an inside surface, which is in contact with the user's wrist when the device is in the closed position. On the inside surface is disposed either a keypad unit for providing signals to the cellular telephone device or at least one display unit. The device comprises a cellular phone mechanism and a battery, which are housed in the members. In a preferred embodiment, the two members are C-shaped and are pivotably connected at one end by a hinge and are detachably connected at a second end by a releasable clasp mechanism. The second end of each member also comprises a speaker unit and a microphone, respectively, such that, when the device is in an open position, the speaker unit and the microphone are positionable proximate to a user's ear and mouth. An outer surface of the members may comprise a display unit, a keypad, a watch unit, or a speaker unit and microphone.

15 Claims, 5 Drawing Sheets

WRIST-MOUNTED TELEPHONE DEVICE

RELATED APPLICATIONS

This application is a continuation-in-part, and claims priority to U.S. application Ser. No. 08/867,062 filed Jun. 2, 1997 and issued as U.S. pat. No. 6,035,035 on Mar. 7, 2000, and incorporated herein by reference.

RELATED DATA

This application claims the benefit of priority of U.S. Provisional Patent Application Ser. No. 60/114,739 filed on Jan. 4, 1999, currently pending.

FIELD OF THE INVENTION

The present invention generally relates to portable cellular telephone devices, and more particularly to a wrist-worn cellular phone.

BACKGROUND OF THE INVENTION

Thanks to the recent advances in wireless communication technology, cellular telephones enjoy enormous popularity. While early models were large and heavy, and therefore difficult for a user to carry comfortably, newer models have steadily decreased in size and weight. The cellular telephones which are in use today are compact enough to fit a person's pocket or purse.

While the new models enjoy increased portability, they do suffer from several drawbacks. For instance, their light weight and small size renders the telephones prone to falling, breaking, or simply being forgotten. Additionally, when a cellular telephone user receives a call, a time loss is experienced while the user locates and retrieves the telephone (which may be in her pocket, purse, brief case, etc.).

In order to overcome these drawbacks, cellular telephones which can be worn on the wrist of a user have also been developed. Some of these devices are described in U.S. Pat. Nos. 5,239,521; 5,274,513; 5,224,076. In all these disclosures a telephone device is typically in the form of a wristwatch fastened to the user's wrist via a strap, wherein a cellular phone mechanism replaces that of a watch in its conventional location. The main components of a cellular phone mechanism, such as transceiver, telephone call initiating means, a keyboard, a voice recognition device, a display, etc., as well as a battery power source, are accommodated within a common case. A microphone and a speaker are usually incorporated within the strap.

One of the problems which is experienced by the wrist-mounted cellular phones in the prior art is that they are difficult for a user to operate. For instance, some of the cellular telephone devices of the prior art remain attached to the user's wrist while the user is conducting a conversation. Thus, a user initiates a call by pressing the keypad of the device while the device is mounted to a wrist, then holds her wrist next to her ear in order to carry on a conversation. Because the microphone and speaker of the devices are fixed in a predetermined location on the device, the user is often required to hold his or her arm in an unusual position in order to line up the microphone and speaker with his or her mouth and ear, respectively. Alternatively, some of the cellular telephone devices of the prior art require that the device be removed from the user's wrist prior to initiating or receiving a telephone call.

In addition, the decrease in size of the cellular phone to that which can comfortably be worn on a person's wrist typically results in a corresponding decrease in the overall size of the keypad of the cellular phone. The small overall size of the keypad in turn requires that the keys of the keypad be smaller and/or closer in proximity. The small, closely-spaced keys are difficult for a user to operate, in that the wrong keys may be inadvertently pressed.

Thus, a need exists for an improved wrist-worn cellular telephone device.

SUMMARY OF THE INVENTION

According to one embodiment, the present invention is directed to a cellular telephone device comprising two C-shaped members which are configured to be detachably secured around a wrist of a user. The members have an inside surface, which is in contact with the user's wrist when the device is in the closed position. On the inside surface is disposed either a keypad unit for providing signals to the cellular telephone device or at least one display unit. According to one embodiment, the device comprises a cellular phone mechanism, which is configured to transmit and receive communication signals, and which is housed in one of the members. In addition, the device comprises a battery which is configured to supply power to the cellular phone mechanism, and which is also housed in one of the members.

In a preferred embodiment, the two members are C-shaped and are pivotably connected at one end by a hinge and are detachably connected at a second end by a clasp mechanism. The clasp mechanism maintains the two members in a closed position around the user's wrist, until the user actuates a clasp release mechanism, wherein the members are pivotable into an open position. The clasp mechanism may comprise a latch on one member which engages a recess in the other member.

Preferably, one of the members comprises a speaker unit while the other member comprises a microphone. The speaker unit and the microphone are configured such that, when the device is in an open position, the speaker unit and the microphone are positionable proximate to a user's ear and mouth, respectively.

Furthermore, according to another embodiment of the invention, the members further comprise an outer surface, wherein various features of the cellular telephone are disposed on the outer surface. For instance, mounted on the outer surface may be a display unit, the keypad, or a watch unit. Furthermore, according to one embodiment, mounted on the outer surface is a speaker unit and a microphone, which are configured to be employed by said user when said device is in said closed position.

BRIEF DESCRIPTION OF THE DRAWINGS

In order to understand the invention and to see how the same may be carried out in practice, several preferred embodiments will now be described, by way of example only, with reference to the accompanying drawings, in which.

DETAILED DESCRIPTION OF THE INVENTION

Figure 1A:
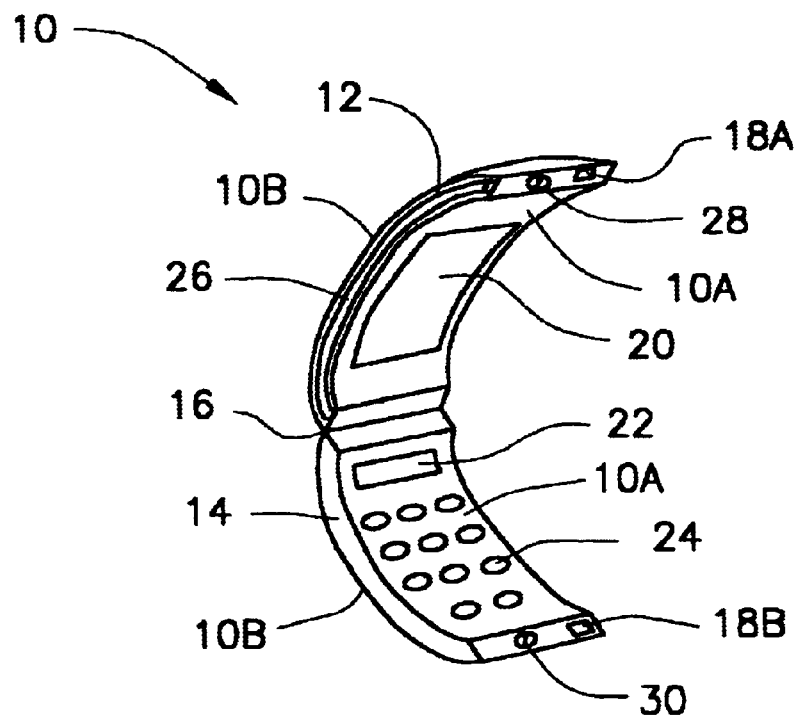
FIGS. 1(*a*) and 1(*b*) illustrate a wrist-mounted cellular phone device, according to one embodiment of the invention.

FIGS. 1(a) and (b) illustrate a wrist-mounted telephone device 10 which comprises a housing in the form of a bracelet having two C-shaped members 12 and 14. The members 12 and 14 are at one end permanently coupled by a pivot 16, such as a hinge, so as to be pivotable relative to one other. The two members 12 and 14 pivot between a closed position, such as when device 10 is being worn on the wrist of a user (as illustrated in FIG. 1,(b)), and an open position, so as to remove the device from the user's wrist (as illustrated in FIG. 1(a)).

Each of members 12 and 14, at an end which is opposite to pivot 16, has a clasp mechanism 18. For instance, member 12 has clasp mechanism 18a which engages with clasp mechanism 18b of member 14. Clasp mechanism 18a may comprise a latch which is configured to engage a corresponding recess 18b. It is noted, however, that the present invention is not limited in scope by the type of clasp mechanism which is employed, and that any manner of detachably connecting the ends of members 12 and 14, such as by a magnetic coupling, latch, etc., is contemplated by the present invention. In addition, the present invention may also employ a clasp mechanism actuator 18c, such as a clasp release button, in order to provide a means for quickly and easily disconnecting the mechanism.

Figure 2A:
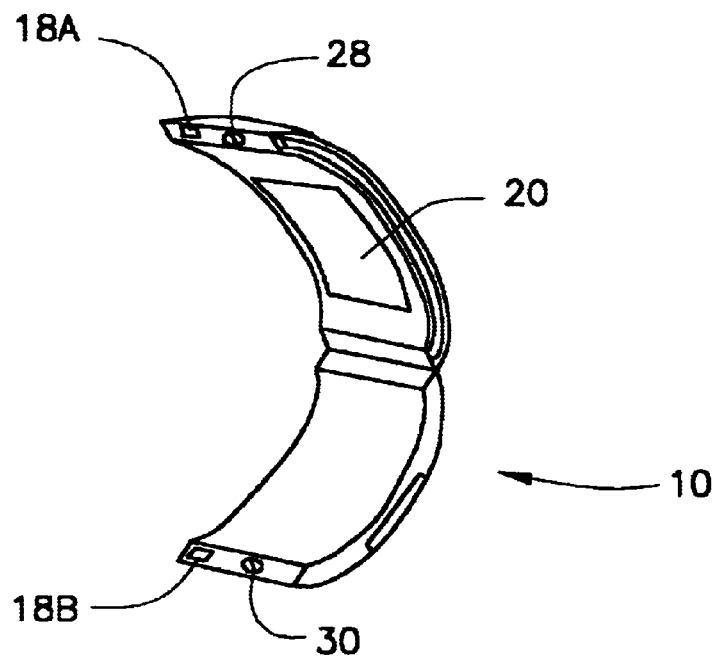
FIGS. 2(*a*) and 2(*b*) illustrate a wrist-mounted cellular phone device, according to another embodiment of the invention.

According to one embodiment and as shown in FIGS. 1(a) and (b), device 10 may be configured to wrap around the user's wrist in such a manner that the interactive components of a conventional cellular phone mechanism are disposed on the inside surface 10a of device 10. Inside surface 10a is the surface of device 10 which is in contact with the user's wrist when device 10 is in the closed position. On the other hand, device 10 may also be configured such that the interactive components are disposed on the outside surface 10b of device 10 as shown in FIGS. 2(a) and (b) and which is explained in more detail below.

Referring to FIGS. 1(a) and (b), inside surface 10a of member 12 comprises display 20, such as a liquid crystal display configured to display data to the user. Preferably, and as shown in FIG. 1(a), display 20 is large in size. For example, according to one embodiment of the present invention, display unit 20 is large enough to display a menu from which the user makes selections in order to operate the telephone device 10, or to display data received via wireless Internet applications. In one embodiment, when cellular phone mechanism 20 is equipped with Internet browser technology, display unit 20 is configured to display data such as stock prices, weather and traffic reports, driving directions, etc.

Inside surface 10a of member 14, on the other hand, comprises display 22 and keypad 24. Advantageously, display 22 is configured to display a number currently dialed by the user when transmitting an outgoing call from the device, a number of a remote telephone device generating an incoming call (if such option is authorized by an owner of the remote telephone), a date or time, etc. Keypad 24 comprises buttons which, when pressed by the user, provide signals for operating the cellular telephone mechanism. Preferably, keypad 24 is configured the same as the keypad of a conventional telephone.

C-shaped member 12 is also employed as the housing for battery 26. According to this embodiment, battery 26 is C-shaped like member 12 and is dimensioned so as to be fit into and removed out of member 12. Thus, member 12 may be generally hollow so as to store battery 26. To this end, member 12 may be provided internally with a pair of peripheral slots, or guides (not shown), so as to allow the battery to be slid in and out in a conventional manner. It is understood, although not specifically shown, that battery 26 is electrically connected to the respective components of the phone mechanism accommodated in member 14. To this end, electric wires are appropriately located inside members 12 and 14.

Member 14 is likewise employed as a housing for the cellular telephone mechanism, which is not illustrated but which comprises the convention components of a cellular telephone mechanism, such as a transmitter, receiver, antenna, microprocessors, I/O units, etc. The cellular telephone mechanism is configured to receive signals provided by the buttons of keypad 24 and to receive and transmit wireless communication signals, process incoming data, etc.

In addition, member 12 also comprises a speaker unit 28, which is disposed on the same end of member 12 as clasp mechanism 18a. In addition, member 14 also comprises a microphone 30, which is disposed on the same end of member 14 as clasp mechanism 18b. Speaker unit 28 is configured to be positionable near the user's ear, while microphone 30 is configured to be positionable near the user's mouth, when the device 10 is in operation.

Figure 1B:
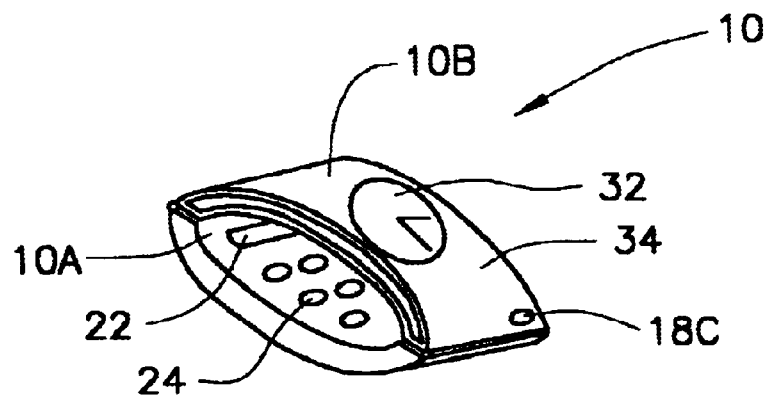

Furthermore, according to another embodiment of the invention, device 10 further comprises a watch unit 32 that operates independently from cellular phone mechanism 20. For instance, FIG. 1(b) illustrates device 10 comprising watch unit 32 mounted on outside surface 10b of member 12, though may also be mounted on outside surface 10b of member 14. Obviously, any means may be used to attach watch unit 32 to device 10. For example, the watch 32 may be removably or detachably mounted on surface 10b, or may be mounted on an aesthetic cover 34 which is itself detachably mounted to outside surface 10b. Also, device 10 may be configured to have watch unit 32 positioned on any region of device 10.

Figure 2B:
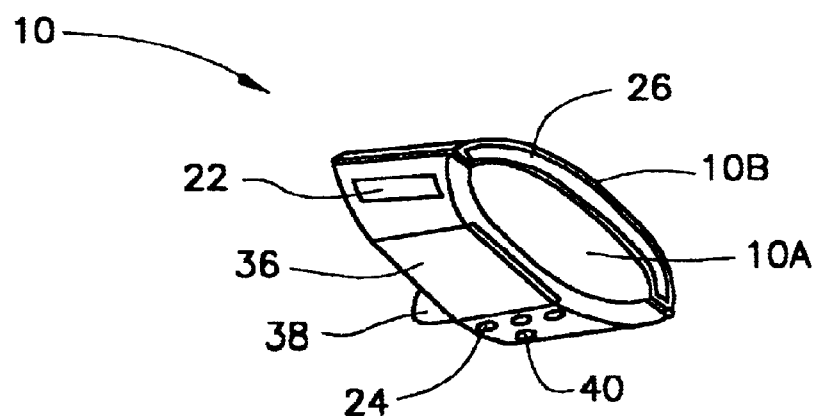

As previously mentioned, FIGS. 2(a) and (b) illustrate the wrist-worn cellular telephone device 10 of the present invention in accordance with another embodiment. Again, the two members 12 and 14 pivot between a closed position, such as when device 10 is being worn on the wrist of a user (as illustrated in FIG. 2(b)), and an open position, so as to remove the device from the user's wrist (as illustrated in FIG. 2(a)). In this embodiment, some of the interactive features of the device, such as a display unit 22 and keypad 24 are located on outside surface 10b of device 10, rather than on inside surface 10a. In this manner, a user may operate device 10 without removing it from his or her wrist.

FIGS. 2(a) and (b) illustrate other features of this embodiment which are similar to the features previously discussed in connection to the device 10 illustrated in FIGS. 1(a) and (b). For instance, even though display 22 and keypad 24 are located on the outside surface 10b of device 10, a large display unit 20 may be located on inside surface 10a of member 12 so that the user may view additional data when desired. Members 12 and 14 may comprise speaker unit 28 and microphone 30, respectively, and interlocking clasp mechanisms 18a and 18b.

The embodiment of FIGS. 2(a) and (b) also has keypad cover 36, which is configured to protect the buttons of keypad 24 from dust, water, or accidental contact. Furthermore, the embodiment of FIGS. 2(a) and (b) has an additional speaker unit 38 and microphone 40, enabling the device to be operated by the user without being removed from her wrist.

When not in operation, device 10 is advantageously worn on the wrist of user, enabling the user to comfortably and conveniently keep the cellular telephone device on his or her person, without fear of dropping it, losing it, etc. In addition, a user never has to lose time searching pockets, purses, etc. in trying to locate the device when it is needed to be used, because the device is always in a known, easy-to-reach position. As previously mentioned, when not in operation, device 10 is maintained on the user's wrist in the closed position shown in FIG. 1(b) or 2(b).

When the user desires to operate the embodiment of device 10 which is shown in FIG. 1(a), such as by initiating a call or by answering an incoming call, the user presses clasp mechanism actuator 18c in order to remove device 10 from the wrist. Device 10 is then held by the user in the position shown in FIG. 1(a), whereby the user can see display units 20 and 22 and can press the desired buttons of keypad 24. In order to communicate with another party via the wireless connection, the user positions speaker unit 28 near her ear and positions microphone 30 near her mouth.

The embodiment which is shown in FIGS. 2(a) and (b) has the additional feature of permitting the user to perform various functions without removing the device from the user's wrist. For instance, when the user is wearing device 10 on her wrist and an incoming call is received, device 10 is configured according to one embodiment to display the telephone number of the calling party on display unit 22, which is visible to the user without removing device 10. The user can then select whether or not she desires to answer the call.

Additionally, according to the embodiment of the invention shown in FIGS. 2(a) and (b), a user may dial a telephone number using the buttons of keypad 24 without removing the device from the user's wrist. For instance, when the user is wearing device 10 on her wrist and desires to make a telephone call, she may press the appropriate buttons of keypad 24 and when the called party is connected, may communicate with the called party by speaking into microphone 40 and listening to speaker unit 38. The user also has the option to remove device 10 from her wrist in order to view large display unit 20, and can communicate with another party by using speaker unit 28 and microphone 30.

Figure 3:
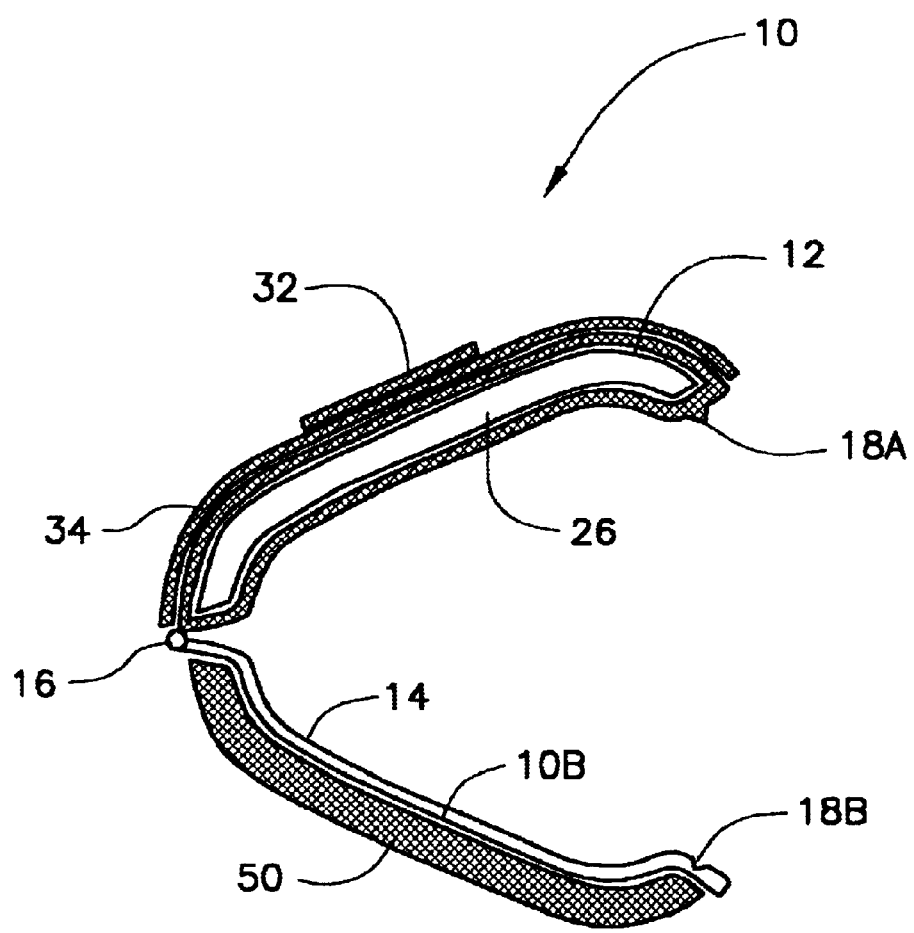
FIG. 3 is a side view of a wrist-mounted cellular phone device, according to another embodiment of the invention.

Still another embodiment of the present invention is illustrated in FIGS. 3 though 5(b). For instance, FIG. 3 is a side view of device 10. As in the embodiments shown in FIGS. 1 and 2, the wrist-mounted cellular telephone device 10 illustrated in FIG. 3 comprises a pair of C-shaped members 12 and 14, which are pivotably connected at one end by hinge 16 and detachably secured at their other end by clasp mechanism 18a and 18b. Battery 26 is housed in member 12, which also has a decorative cover 34 with a watch unit 32 attached.

In this embodiment, however, the cellular phone mechanism is located in a handset 50, which is detachably mounted to member 14. For instance, handset 50 is configured so as to have a C-shape which corresponds to the C-shape of member 14. When handset 50 is not in operation, it is attached to outer surface 10b of member 14.

Figure 4A:
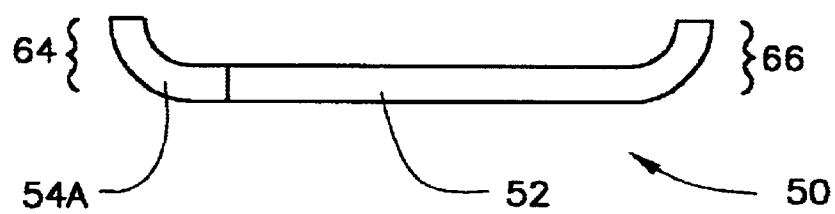
FIGS. 4(*a*) and 4(*b*) are side views of a handset for a wrist-mounted cellular phone device, according to an embodiment of the invention.

Handset 50, according to one embodiment of the present invention, comprises the cellular telephone mechanisms of a convention cellular phone, such as a transmitter, receiver, antenna, microprocessor, etc. However, it is noted that all or some of these features may be located elsewhere on device 10 so as to remain attached to the user's wrist. FIGS. 4(a) and (b) illustrate a side view of handset 50 detached from member 14, in a closed and an open position, respectively. On the other hand, FIGS. 5(a) and (b) illustrate a front view of handset 50 detached from member 14, in a closed and an open position, respectively.

Figure 5A:
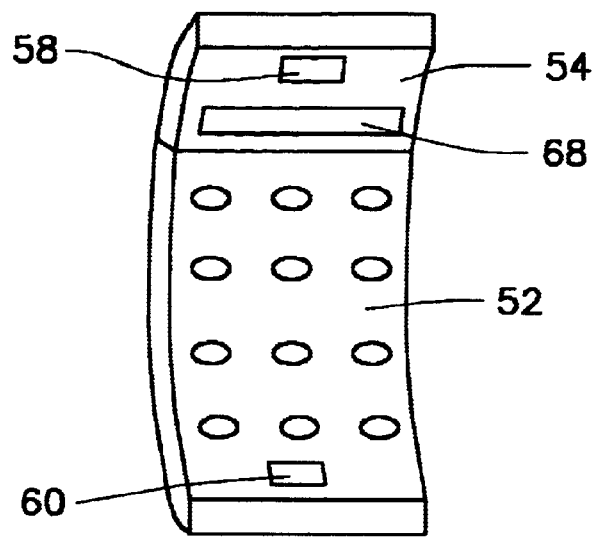
FIGS. 5(a) and 5(b) are front views of a handset for a wrist-mounted cellular phone device, according to an embodiment of the invention.

According to one embodiment of the invention, handset 50 has two telescopically extendable handset sections, 52 and 54, which have, according to a preferred embodiment, a very small thickness. A speaker unit 58 is disposed on one end of handset section 54, while a microphone 60 is disposed on an opposite end of handset section 52. Telescopically extendable handset sections 52 and 54 slidably engage relative to each other between an open position and a closed position, such as by traveling along one or more guides 62 (such as parallel guides or a rail guide) provided internal to one of the sections. In FIGS. 4(a) and 5(a), handset 50 is shown in the closed position. In the closed position, handset 50 has a small length, and occupies a small amount of space, thus rendering it easy to store between uses on member 14 of the wrist-worn device.

Figure 4B:
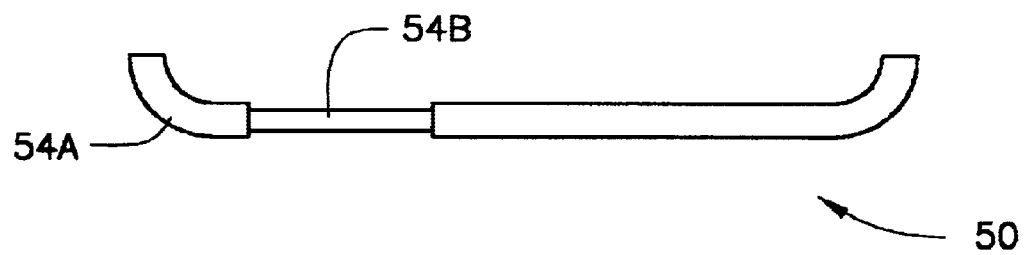
Figure 5B:
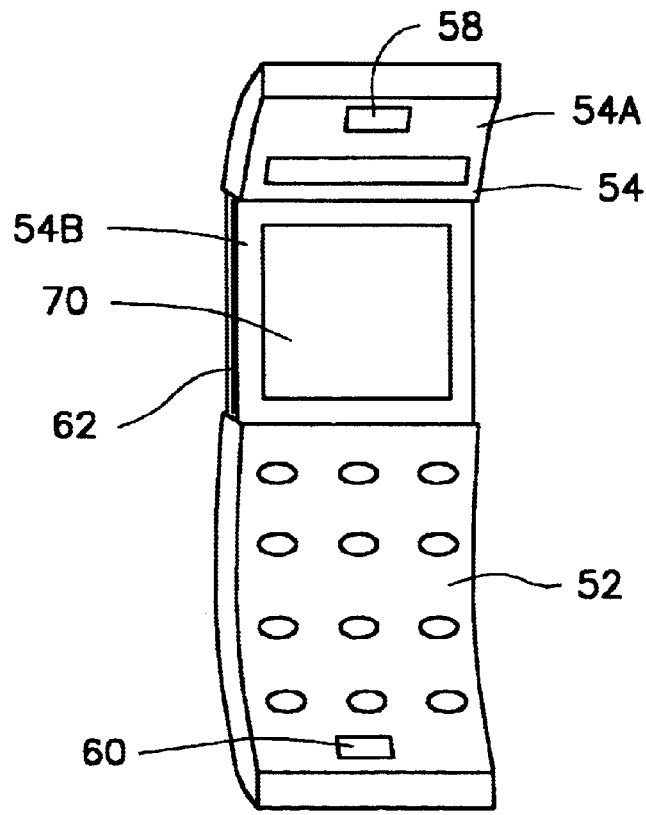

In FIGS. 4(b) and 5(b), handset 12 is shown in an open position. In the open position, handset 12 has a longer length than in the closed position. Thus, in the open position, speaker 58 and microphone 60 are in closer proximity to the typical user's ear and mouth during usage, although the invention is not limited in scope in this regard. For example, sections 52 and 54 of handset 50 may also fold around a linear hinge (not shown) in order to achieve the same extendability, or else may rotate around pivot 13b. The present invention contemplates that sections 52 and 54 may be extended by other means known in the art.

An additional feature of handset 50 is the perpendicular extension regions 64 and 66 of handset 50 at speaker unit 58 and microphone 60, respectively. When handset 50 is in the open position, extended regions 64 and 66 enable speaker unit 58 and microphone 60 to be held closer to the user's ear and mouth during operation. Extended regions 64 and 66 of handset 50 are also configured such that, when handset 50 is in the closed position, the extensions frictionally engage a corresponding mating region on member 14. Preferably, speaker unit 58 and microphone 60 may be disposed on these perpendicular extensions, as shown in FIGS. 5(a) and 5(b). In one embodiment of the invention, handset 50 is hermetically sealed to provide protection from water, dust, etc.

FIGS. 5(a) and (b) also show additional features of handset 50, according to one embodiment of the present invention. For instance, section 52 of handset 50 is shown having keypad 24 disposed thereon. In this configuration, keypad 24 abuts outer surface 10b of member 14 when handset 50 is attached to the member, such that the buttons of keypad 24 are protected from dust, water, accidental contact, etc.

In addition, small display panel 68 is disposed on section 54 of handset 50, enabling the display of a telephone number or other desirable information. A large display panel 70 is disposed on extending region 54b, such that display panel 70 is hidden from view when handset 50 is in the closed position. When the telescoping sections 52 and 54 of handset 50 are in the open position, display panel 70 can be seen by a user. As in the previous embodiments, display unit 70 is preferably large enough to display a menu from which the user makes selections in order to operate the telephone device 10, or to display data received via wireless Internet applications. In one embodiment, when the cellular phone mechanism is equipped with Internet browser technology, display unit 70 is configured to display data such as stock prices, weather and traffic reports, driving directions, etc.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. A cellular telephone device comprising:
   at least two members configured to be detachably secured around a wrist of a user, said members having an inside surface said inside surface facing said user's skin, and an outside surface;
   a watch unit fixedly attached to said outside surface;
   a keypad unit for providing signals to said cellular telephone device; and
   at least one display unit, wherein at least one of said keypad unit and said display units are located on said inside surface of said members.

2. The device according to claim 1, wherein said device further comprises
   a cellular phone mechanism configured to transmit and receive communication signals, wherein said cellular phone mechanism is housed in one of said members.

3. The device according to claim 1, wherein said device further comprises
   a battery configured to supply power to said cellular phone mechanism, wherein said battery is housed in one of said members.

4. The device according to claim 1, wherein said at least two members comprise a pair of C-shaped members.

5. The device according to claim 4, wherein said pair of C-shaped members are pivotably connected at one end by a hinge and are detachably connected at a second end by a clasp mechanism, wherein said clasp mechanism maintains said members in a closed position around said user's wrist.

6. The device according to claim 5, wherein said pair of members pivot to an open position when said user actuates a clasp release mechanism.

7. The device according to claim 5, wherein said clasp mechanism comprises a latch, configured on one said member to engage a recess in another said member.

8. The device according to claim 5, wherein said clasp mechanism is magnetic.

9. The device according to claim 5, wherein one of said members further comprises a speaker unit and a second of said members comprises a microphone.

10. The device according to claim 6, wherein said speaker unit and said microphone are configured such that, when said device is in an open position, said speaker unit and said microphone are positionable proximate to a user's ear and mouth, respectively.

11. The device according to claim 1, wherein said members further comprise an outer surface.

12. The device according to claim 11, wherein mounted on said outer surface is at least one display unit.

13. The device according to claim 11, wherein mounted on said outer surface is said keypad.

14. The device according to claim 11, wherein mounted on said outer surface is a watch unit.

15. The device according to claim 11, wherein mounted on said outer surface is a speaker unit and a microphone, said speaker unit and said microphone configured to be employed by said user when said device is in said closed position.

* * * * *